Oct. 16, 1962   J. B. SNOY ET AL   3,058,373
TRANSMISSION CONTROL SYSTEM
Filed March 4, 1960   3 Sheets-Sheet 1

Inventors:
Joseph B. Snoy and
Frederick J. Snoy
By: Francis T. Drumm
Atty.

Oct. 16, 1962　　　J. B. SNOY ET AL　　　3,058,373

TRANSMISSION CONTROL SYSTEM

Filed March 4, 1960　　　　　　　　　　　　3 Sheets-Sheet 2

Inventors:
Joseph B. Snoy and
Frederick J. Snoy
By: Francis T. Drumm   Atty.

United States Patent Office 3,058,373
Patented Oct. 16, 1962

3,058,373
TRANSMISSION CONTROL SYSTEM
Joseph B. Snoy and Frederick J. Snoy, Rockford, Ill., assignors to Borg-Warner Corporation, Chicago, Ill., a corporation of Illinois
Filed Mar. 4, 1960, Ser. No. 12,776
12 Claims. (Cl. 74—732)

This invention relates to a transmission control system and more particularly to a control system for a transmission of the power shift type.

More particularly, the invention relates to a control system for a transmission having a torque converter provided with a lock-up clutch and a gear train selectively actuatable by one or more double acting hydraulic clutches of the type described and claimed in Patent No. 2,920,732, Elmer A. Richards and Joseph B. Snoy, filed June 25, 1956, and Patent No. 2,868,341, Joseph B. Snoy, filed April 1, 1957.

A primary object of the invention is to provide a transmission of the stated type wherein the lock-up clutch is engageable when the transmission output speed reaches a predetermined value, wherein means are provided for selectively directing fluid to one side or the other of the double acting hydraulic clutches for determining desired speed ratios, wherein means are provided for disengaging the lock-up clutch during the ratio shift and wherein means are provided for delaying re-engagement of the lock-up clutch to assure smooth shifting.

A further object of the invention is to provide a transmission control system of the mentioned character wherein a control valve is provided for the lock-up clutch, wherein the control valve is actuated by a solenoid, wherein the solenoid is energized in response to the operation of an output shaft governor and wherein the lock-up clutch is disengaged in response to a change-speed condition.

Another object of the invention is to provide a control system of the character described wherein a selector valve is provided having an arm pivotal to several arcuate positions corresponding to several speed ratios and wherein de-energization of the solenoid circuit is effected by movement of the selector valve arm from one position to the other.

A further object of the invention is to provide a transmission control system in accordance with the preceding objects wherein hydraulic means are provided for delaying re-energization of the solenoid circuit and re-engagement of the lock-up clutch.

Another object of the invention is to provide a transmission control system in accordance with the preceding objects wherein a lock-up release switch is arranged in the solenoid circuit and wherein the release switch is actuated in response to movement of a coxcomb movable with the selector valve arm.

Another object of the invention is to provide a transmission control system of the type above set forth in which a plurality of pressure switches are arranged in parallel and in which energization of the solenoid circuit is afforded only when one of these pressure switches, each corresponding to a speed ratio, is closed.

A further object of the invention is to provide a transmission control system of the type described wherein pneumatic means are provided for delaying the re-engagement of the lock-up clutch.

This invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

Figures 1, 2:
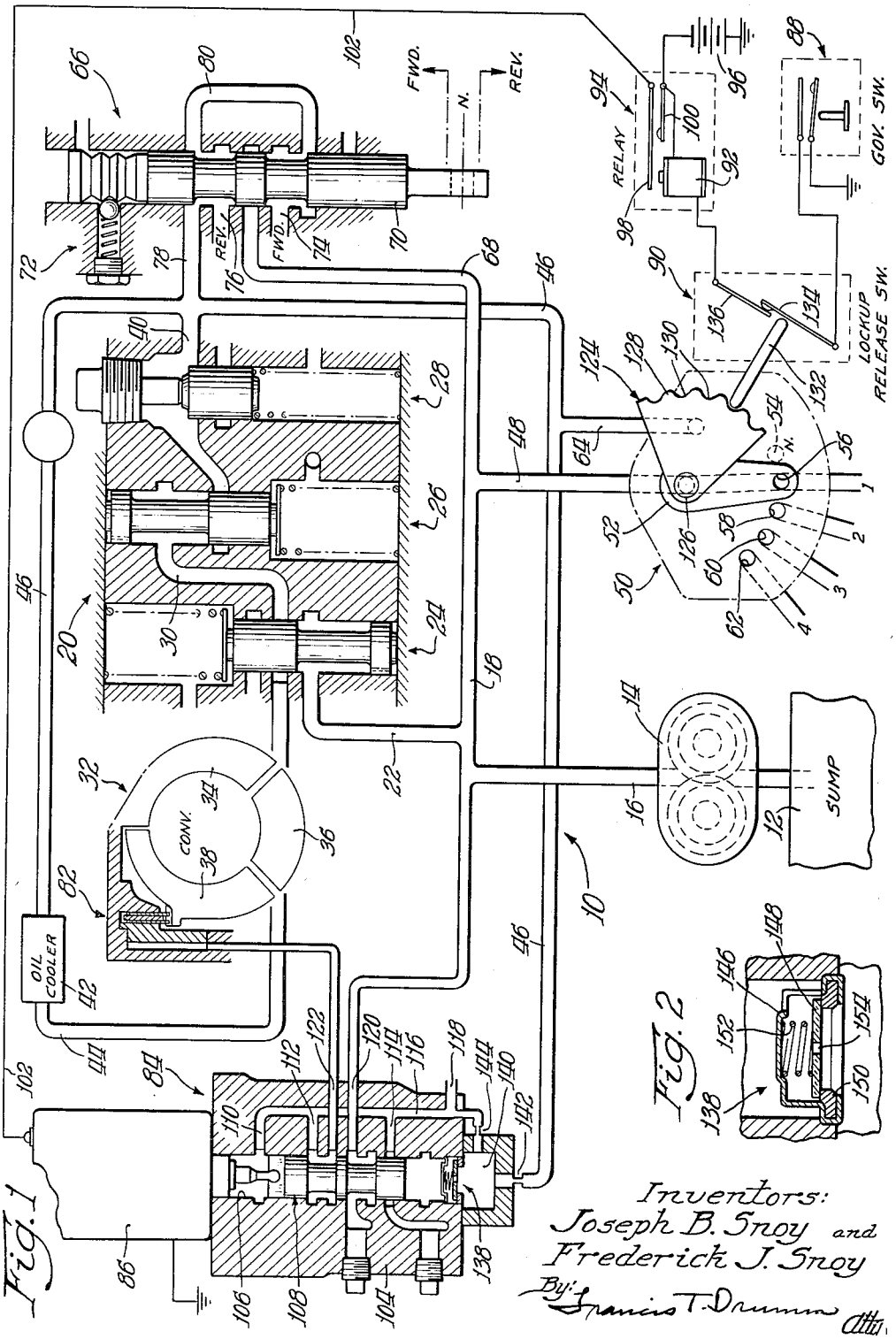
FIGURE 1 is a schematic view illustrating a transmission control system made in accordance with the present invention.
FIGURE 2 is an enlarged elevational sectional view of a valve forming a part of the control system of FIGURE 1.

Referring to the drawings and more particularly to FIGURE 1 the transmission control system of the present invention, indicated generally by reference numeral 10 includes a sump 12 and a pressure pump 14 for drawing fluid from the sump 12 and discharging this fluid under pressure into a conduit 16. Communicating with the conduit 16 is a manifold 18 which is connected with a multiple pressure regulator 20 by means of a conduit 22. The regulator 20 includes a first stage 24 for regulating the pressure of the fluid in the manifold 18 and the conduits 16 and 22 to a predetermined value, a second stage 26 and a third stage 28. Formed in the body of the valve 20 is a passage 30 through which fluid may flow to a torque converter 32 which includes an impeller 34, a stator 36, and a turbine 38. The stator 36 may be connected to ground by a suitable one-way engaging device and the turbine 38 may be connected to an output shaft (not shown). The converter 32 is intended for use in a transmission of the type described and claimed in the co-pending application of Elmer A. Richards, Ser. No. 630,668, filed December 26, 1956, now Patent No. 2,953,038, the disclosure of which application is incorporated herein by reference. Fluid pressure within the converter 32 is regulated by the second stage 26 of the valve 20. The third stage 28 regulates the pressure at an outlet port 40 to a predetermined value considerably lower than that existing in the converter 32. Fluid under pressure may flow from the converter 32 to an oil cooler 42 by means of a conduit 44 and from thence into a conduit 46 at substantially the same pressure existing at the outlet port 40 of the third stage 28.

Figure 1A:
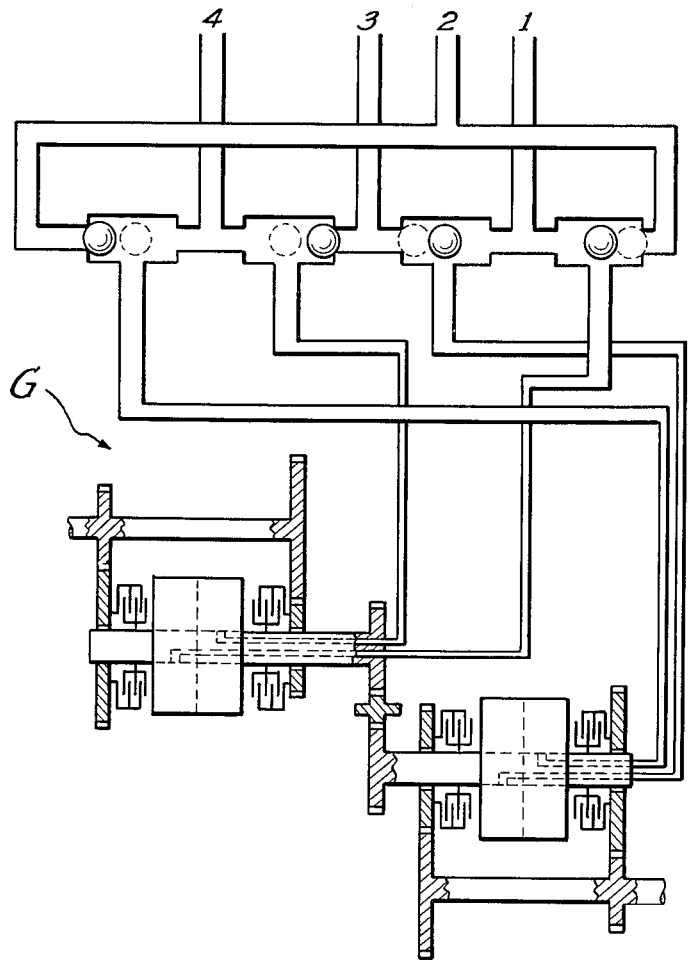
FIGURE 1A is a schematic view illustrating a change-speed gearing mechanism with which the control system of FIGURE 1 may be preferably used.

Fluid under pressure may be transmitted to a conduit 48 to a selector valve 50 of the type described and claimed in the U.S. Patent No. 2,979,963, Joseph B. Snoy, for selective distribution to double acting clutches forming a part of a change-speed gearing "G" (illustrated in FIGURE 1A) and which is more fully detailed in said patent. The double acting clutches are described and claimed in Patent No. 2,868,341, Joseph B. Snoy, or Patent No. 2,920,732, Elmer A. Richards and Joseph B. Snoy. These double acting clutches form a part of the transmission described and claimed in the co-pending application of Elmer A. Richards, SN 630,668, filed December 26, 1956, now Patent No. 2,953,038.

As set forth more fully in Patent No. 2,979,963 the selector valve 50 includes a selector arm 52 which may be manually rotated to register with openings 54, 56, 58, 60, or 62 to obtain a neutral position or first, second, third and fourth speed ratios. As also described more fully in Patent No. 2,979,963 the low pressure conduit 46 is connected to the selector valve 50 by means of a conduit 64.

A valve 66 is connected to the high pressure manifold 18 by means of a conduit 68. This valve has a plunger 70 which may be moved from the neutral position illustrated to the "forward" position for a full range of forward speeds or to the "reverse" position for a full range of reverse speeds. The plunger 70 may be maintained in either of the three positions by means of a detent assembly 72. The valve 66 has an outlet port 74 leading to a direct drive clutch (not shown) and an outlet port 76 leading to a reverse drive clutch (not shown). In the neutral position illustrated fluid under reduced pressure is exerted in both forward and reverse clutches through conduits 78 and 80. When the plunger 70 is in the forward position fluid under reduced pressure is applied to the reverse clutch, and likewise, fluid under reduced pressure is applied to the forward clutch when the plunger 70 is in the reverse position.

An important feature of the present invention resides in the provision of a lock-up clutch 82, the actuation of the lock-up clutch 82 when the converter output shaft reaches a predetermined speed, the momentary release of the lock-up clutch during ratio shifts of the transmission to obtain a more gentle shift, and delaying re-engagement of the lock-up clutch for a sufficient length of time to prevent successive engagement and disengagement under certain conditions. To this end, a control valve 84 energized by a solenoid 86 is provided. The solenoid 86 is energized when a governor switch 88 is closed when the transmission output shaft reaches a predetermined value. The switch 88 is connected through a normally closed switch 90 to a coil 92 forming a part of a relay 94. The relay 94 is connected to a battery 96 and has a contact arm 98 for engaging a contact 100 when the coil 92 is energized thereby to energize a conductor 102 leading to the solenoid 86. The purpose of the relay 94 is to accommodate momentary heavy current draw of the solenoid 86 when energized.

The control valve 84 includes a valve body 104 having a bore 106 in which a plunger 108 is slidably received, passages 110, 112 and 114 communicating with an exhaust manifold 116 and intercepting the bore 106, an exhaust port 118 for the manifold 116, a passage 120 for reception of high pressure fluid from the manifold 18 and a passage 122 for supplying fluid under pressure to the lock-up clutch 82 and exhausting fluid therefrom. The valve 84 is illustrated in the "off" position. In this position the lock-up clutch 82 is exhausted through passage 122, the bore 106, the passage 112, exhaust manifold 116, and exhaust port 118 to sump. In this position also the governor switch 88 is open and the solenoid 86 deenergized. When the solenoid 86 is energized upon closing of the governor switch 88 the plunger 108 is moved downwardly until communication is afforded between the passage 120 and the passage 122 so that high pressure fluid may flow from the manifold 18 to the lock-up clutch 82.

According to an important feature of the invention, means are provided to disengage the clutch 82 during the course of ratio shifts. For this purpose a coxcomb cam 124 is arranged for rotation with a shaft 126 about the axis of which the selector arm 52 of the selector valve 50 rotates. The coxcomb 124 is of sector configuration and is formed at its periphery with a plurality of nodes 128 and grooves 130. A strut 132 is arranged to move outwardly when engaged by one of the nodes 128 to move an arm 134, forming a part of the switch 90, out of engagement with an arm 136. By this arrangement, the solenoid 86 is deenergized, the plunger 108 is moved back to the position illustrated by conventional spring means and power is again transmitted through the converter 32.

As the plunger 108 retracts to the position illustrated, a valve 138 is opened and the bore 106 below the plunger 108 is filled from a chamber 140 to which low pressure fluid is supplied from the conduit 64 by means of a restricted orifice 142 of a diameter, in the present illustrative embodiment, in the order of .172 inch. Fluid is exhausted from the chamber 140 through an orifice 144 of a diameter preferably in the order of .125 inch. By this arrangement a low pressure in the order of 5 p.s.i. may be maintained in the chamber 140.

Referring now more particularly to FIGURE 2, the valve 138 includes a spider 146 and a disc 148 which is normally biased against a seat 150 by a spring 152. When the solenoid 86 is deenergized and the plunger 108 retracted, the disc 148 is unseated to permit the flow of fluid from the chamber 140 to the interior of the bore 106.

According to the present invention, movement of the plunger 108 to the position in which the lock-up clutch 82 is dis-engaged is retarded by the provision of a restricted orifice 154 in the disc 148. The orifice 154, in the present instance, is desirably in the order of .015 inch diameter. It will be understood that the dimensions of the orifices 142, 144 and 154 may be varied to alter the response of the plunger 108 to energization and deenergization of the solenoid 86. It will be appreciated also that the range shift of the transmission is completed during the time lag and that the power train may adjust to its new speed and load level during this interval.

Figure 3:
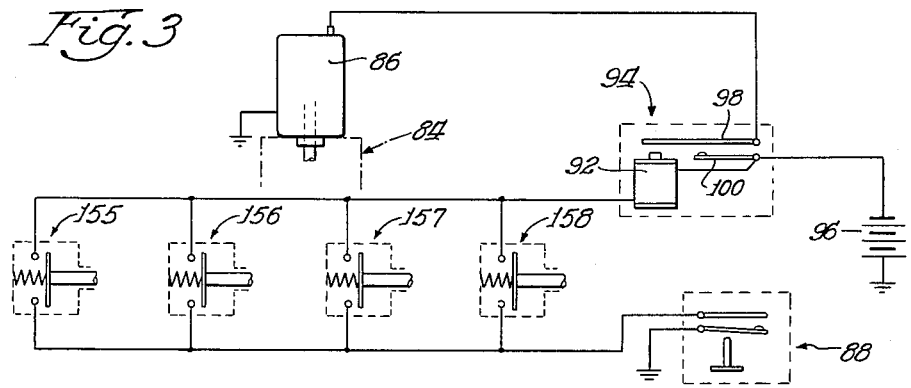
FIGURE 3 is a schematic view of a control circuit of a modified form of the present invention.

Referring now more particularly to FIGURE 3, there is shown in that figure a modified form of the present invention in which a series of pressure switches 155, 156, 157 and 158 are arranged in parallel in a circuit including the governor switch 88, the relay 94, battery 96 and solenoid 86 for operating the control valve 84. The several pressure switches are normally open and are selectively closed when one or the other of the fluid lines leading to the double acting clutches are pressurized. When the ratio shift is made, the clutch pressure drops and one of the pressure switches is opened. A pressure increase in another of the pressure switches is necessary for consequent closing of one of the other pressure switches.

Figure 4:
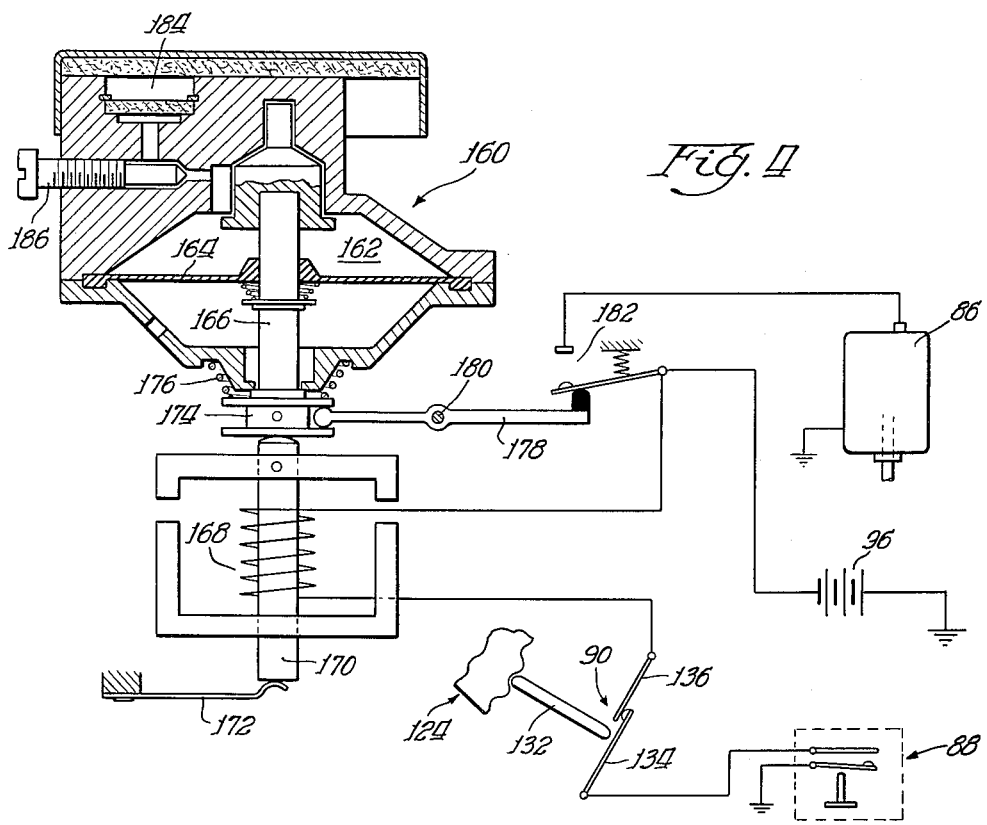
FIGURE 4 is a diagrammatic view of a second modified form of the present invention.

In FIGURE 4 is shown another modified form of the present invention in which the requisite delay in reengaging the lock-up clutch 82 is effected by a pneumatic retarding mechanism 160 having a chamber 162, a diaphragm 164 and a valve stem 166. When the converter turbine shaft speed reaches a predetermined value, the switch 88 is closed to energize a coil 168 which forces a rod 170 downwardly, as viewed in that figure, against the bias of a flat spring 172. A collar 174 is secured to the lower end of the valve stem 166 and is urged downwardly by a spring 176 when the coil 168 is energized. As the collar 174 moves downwardly, a lever 178 pivots about a point 180 to close a switch 182 to complete the circuit for energization of the solenoid 86, as in the principal form of the invention. As the valve stem 166 and diaphragm 164 move downwardly air is drawn into the chamber 162 through an inlet 184. When the switch 90 is opened in the manner set forth in the description of the form of the invention shown in FIGURE 1, the coil 168 is deenergized and the spring 172 biases the rod 170 into engagement with the lower surface of the collar 174 so that the stem 166 and diaphragm 164 return to the position illustrated in FIGURE 4. The discharge of air from the chamber 162 may be regulated by a needle valve 186. It will be appreciated that in this form of the invention the energization of the control circuit is delayed to afford gentle shifting.

While we have described our invention in connection with one specific embodiment thereof, it is to be understood that this is by way of illustration and not by way of limitation and the scope of our invention is defined solely by the appended claims which should be construed as broadly as the prior art will permit.

We claim:
1. A control system for a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of ratio shift positions, a lock-up clutch for said coupling; comprising means for controlling the actuation of said lock-up clutch, said control means comprising a control valve, an electrical circuit including a solenoid for actuating said controll valve, said circuit including a governor switch closable in response to the speed of said driven member for energizing said solenoid, a second switch actuatable in response to movement of said selector valve arm for de-energizing said circuit at each ratio shift, and hydraulic means for delaying the re-engagement of said lock-up clutch.

2. In a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratios of said change speed gear means, a source of fluid under pressure, a selector valve for diverting fluid under pressure to certain of said clutches, a lock-up clutch for said coupling; the improvement comprising means for controlling the actuation of said lock-up clutch, said control means including an electrical energy source, an electrical circuit, a first switch in said circuit operable in response to the speed of rotation of said driven member, a control valve, a solenoid in said circuit for actuating said control valve, a normally closed second switch in said circuit, said first switch being closable to energize the circuit for energization of said solenoid and engagement of said lock-up clutch, and means operable in response to change of position of said selector valve for opening said second switch, de-energizing said solenoid and disengaging said lock-up clutch during the ratio shift, said last-named means being further operable to re-energize said circuit, and hydraulic means for delaying the engagement of said lock-up clutch.

3. In a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratios of said change speed gear means, a source of fluid under pressure, a selector valve for diverting fluid under pressure to certain of said clutches, said selector valve having an arm rotatable to a plurality of positions each corresponding to a speed ratio, a lock-up clutch for said coupling; the improvement comprising means for controlling the actuation of said lock-up clutch, said control means including an electrical energy source, an electrical circuit, a first switch in said circuit operable in response to the speed of rotation of said driven member, a control valve, a solenoid in said circuit for actuating said control valve, a normally closed second switch in said circuit, said first switch being closable to energize the circuit for energization of said solenoid and engagement of said lock-up clutch, and a coxcomb cam rotatable in response to change of position of said selector valve arm for opening said second switch, de-energizing said solenoid and disengaging said lock-up clutch during the ratio shift, said coxcomb being further operable to re-energize said circuit, and hydraulic means for delaying the engagement of said lock-up clutch.

4. In a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means, and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of positions each corresponding to a speed ratio, a lock-up clutch for said coupling; the improvement comprising means for controlling the actuation of said lock-up clutch, said control means including an electrical energy source, an electrical circuit a first switch in said circuit operable in response to the speed of rotation of said driven member, a control valve, a solenoid in said circuit for actuating said control valve, a normally closed second switch in said circuit, said first switch being closable to energize the circuit for energization of said solenoid and engagement of said lock-up clutch, and a coxcomb rotatable in response to change of position of said selector valve arm, a strut arranged in engagement with said coxcomb, said strut being operable in response to movement of said coxcomb to open said second switch, deenergize said solenoid, actuate said control valve and disengage said lock-up clutch during the ratio shift, said strut being further operable to reclose said second switch for reenergization of said circuit, and hydraulic means for delaying the reengagement of said lock-up clutch.

5. In a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of positions each corresponding to a speed ratio, a lock-up clutch for said coupling; the improvement comprising means for controlling the actuation of said lock-up clutch, said control means including an electrical energy source, an electrical circuit, a first switch in said circuit operable in response to the speed of rotaion of said driven member, a control valve, a solenoid in said circuit for actuating said control valve, a plurality of pressure switches arranged in series-parallel relationship in said circuit, said pressure switches being selectively closable in response to fluid pressure conditions in said clutches and being adapted selectively to open when the fluid pressure in a clutch falls below a predetermined value, said first switch being closable to energize the circuit when at least one of said pressure switches is closed for energization of said solenoid and engagement of said lock-up clutch, and means operable in response to change of position of said selector valve for opening one of said pressure switches and closing another of said pressure switches for de-energizing said solenoid, disengaging said lock-up clutch during the ratio shift, and re-energizing said circuit after a predetermined interval.

6. In a power transmission having a driving member, a hydrodynamic coupling provided with a driving element and a driven element, said driving member being operable to actuate said driving element, a driven member, change speed gear means having a plurality of speed ratios, said driven member being operable to actuate such change speed gear means and being operable by said driven element, a plurality of clutches selectively engageable for changing the speed ratios of said change speed gear means, a source of fluid under pressure, a selector valve for diverting fluid under pressure to certain of said clutches, a lock-up clutch for said coupling; the improvement comprising means for controlling the actuation of said lock-up clutch, said control means including a source of electrical energy, an electrical circuit, a first switch in said circuit operable in response to the speed of rotation of said driven member, a control valve, a solenoid in said circuit for actuating said control valve, a plurality of pressure switches arranged in series-parallel relationship in said circuit, said first switch being closable to energize the circuit when at least one of said pressure switches is closed for energization of said solenoid and engagement of said lock-up clutch, said pressure switches being selectively closable when the fluid pressure in certain of said clutches reaches a predetermined value and being openable when the fluid pressure drops below a predetermined value, whereby said solenoid is de-energized, said lock-up clutch is disengaged during the ratio shift, and said solenoid re-energized for engagement of said lock-up clutch after completion of the ratio shift.

7. In a power transmission having a driving member, a hydrodynamic coupling provided with a driving element and a driven element, said driving member being operable tod actuate said driving element, a driven member, change speed gear means having a plurality of speed ratios, said driven members being operable to actuate said change speed gear means and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of positions each corresponding to a speed ratio, a lock-up clutch for said coupling; the improvement comprising means for controlling the actuation of said lock-up clutch, said control means comprising a source of electrical energy, an electrical circuit, a control valve normally biased to a position in which said lock-up clutch is disengaged, a solenoid in said circuit operable upon energization to move said control valve to another position in which engagement of said lock-up clutch is effected, a normally open switch closable to complete said circuit when the speed of said driven member reaches a predetermined value, a normally closed switch in said circuit adapted to open to de-energize said solenoid at each ratio shift in response to movement of said selector valve whereby said lock up clutch is disengaged, said normally closed switch being adapted to close promptly after opening, and hydraulic means for delaying movement of said control valve to the position in which engagement of the lock-up clutch is effected.

8. In a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of positions each corresponding to a speed ratio, a lock-up clutch for said coupling; the improvement comprising means for controlling the actuation of said lock-up clutch, said control means comprising a source of electrical energy, an electrical circuit, a control valve normally biased to a position in which said lock-up clutch is disengaged, a solenoid in said circuit operable upon energization to move said control valve to another position in which engagement of said lock-up clutch is effected, a normally open switch closable to complete said circuit when the speed of said driven member reaches a predetermined value, a plurality of pressure switches arranged in series-parallel relationship in said circuit, one of said pressure switches being closed during a particular speed ratio and being openable in response to a change of pressure condition in one of said clutches, another of said pressure switches being normally open and being closable in response to a change in a pressure condition in another of said clutches, said one pressure switch being adapted to de-energize said solenoid at a ratio shift for actuation of said control valve to the position in which the lock-up clutch is disengaged, said other of said pressure switches being adapted to reenergize said solenoid to move said control valve to a position in which engagement of said lock-up clutch is effected.

9. In a power transmission having a driving member, a hydrodynamic coupling provided with a driving element and driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of position each corresponding to a speed ratio, a lock-up clutch for said coupling; the improvement comprising means for controlling the actuation of said lock-up clutch, said control means comprising a source of electrical energy, an electrical circuit, a control valve normally biased to a position in which said lock-up clutch is disengaged, a solenoid in said circuit operable upon energization to move said control valve to another position in which engagement of said lock-up clutch is effected, a normally open switch closable to complete said circuit when the speed of said driven member reaches a predetermined value, a second normally open switch in said circuit adapted to be closed by closing of said first switch, a normally closed switch adapted to open to de-energize said solenoid at each ratio shift in response to movement of said selector valve whereby said control valve is moved to the position in which said lock-up clutch is disengaged, and pneumatic means for delaying reopening of said second normally open switch until a ratio shift is completed.

10. In a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of positions each corresponding to a speed ratio, a lock-up clutch for said coupling; the improvement comprising means for controlling the actuation of said lock-up clutch, said control means comprising a source of electrical energy, an electrical circuit, a control valve having a bore, a plunger slidably received in said bore, said plunger being normally biased to a position in which fluid communication between said fluid pressure source and said lock-up clutch is prevented, a solenoid in said circuit operable upon energization to move said plunger to another position in which fluid communication is afforded between said fluid pressure source and said lock-up clutch for engagement of said lock-up clutch, a normally open switch closable to complete said circuit when the speed of said driven member reaches a predetermined value, a second normally open switch in said circuit closable upon closing of said first normally open switch, a normally closed switch adapted to open to de-energize said solenoid at each ratio shift in response to movement of said selector valve, and pneumatic means for delaying reopening of said second normally open switch until a ratio shift is completed, 11. In a power transmission having a driving member, a hydrodynamic coupling provided with a driving element and a driven element, said driving member being operable to actuate said driving element, a driven member, change speed gear means having a plurality of speed ratios, said driven member being operable to actuate said change speed gear means and being operable by said driven element, a plurality of clutches selectively engageable for changing the speed ratio of said change speed gear means, a source of fluid under pressure, a selector valve for diverting fluid under pressure to certain of said clutches, said selector valve having an arm rotatable to a plurality of positions each corresponding to a speed ratio, a lock-up clutch for said coupling; the improvement comprising means for controlling the actuation of said lock-up clutch, said control means comprising a source of electrical energy, an electrical circuit, a control valve having a bore, a plunger slidably received in said bore and normally biased to a position in which fluid communication between said fluid pressure and said lock-up clutch is prevented, a solenoid in said circuit operable upon energization to move said plunger to another position in which fluid communication is afforded between said pressure source and said lock-up clutch for engagement of said lock-up clutch, a low pressure chamber forming a part of said control valve and communicating with said bore, a check valve to afford free fluid communication between said low pressure chamber and said bore when said plunger moves to the position in which fluid communication between said fluid source and said lock-up clutch is prevented and to afford limited fluid communication between said bore and said chamber when said plunger moves upon energization of said solenoid to the position in which fluid communication between said fluid source and said lock-up clutch is afforded, a normally open switch closable to complete said circuit when the speed of said driven member reaches a predetermined value, a normally closed switch in said circuit adapted to open to de-energize said solenoid at each ratio shift in response to movement of said selector valve whereby said lock-up clutch is disengaged, said normally closed switch being adapted to close for re-energization of said solenoid promptly after de-energization, said check valve being operable to delay movement of said plunger to the position in which engagement of said lock-up clutch is afforded.

12. A power transmission in accordance with claim 11 wherein fluid communication between said fluid source and said low pressure chamber is effected by means of a restricted orifice of a predetermined limited diameter, and between said chamber and exhaust by means of a restricted orifice of a predetermined smaller diameter.

References Cited in the file of this patent

UNITED STATES PATENTS

| | | |
|---|---|---|
| 2,709,926 | Jandasek | June 7, 1955 |
| 2,738,689 | Dodge | Mar. 20, 1956 |
| 2,777,550 | Forster | Jan. 15, 1957 |
| 2,791,913 | Slack | May 14, 1957 |
| 2,884,806 | Tuck | May 5, 1959 |
| 2,929,478 | Tuck et al. | Mar. 22, 1960 |
| 2,931,238 | Kiechle | Apr. 5, 1960 |
| 2,939,557 | Dabich et al. | June 7, 1960 |
| 2,940,336 | Simpson et al. | June 14, 1960 |
| 2,978,928 | Tuck et al. | Apr. 11, 1961 |
| 2,979,963 | Snoy | Apr. 18, 1961 |